US012208649B2

(12) United States Patent
Shire

(10) Patent No.: US 12,208,649 B2
(45) Date of Patent: Jan. 28, 2025

(54) TIRE COMPRISING AN ELECTRONIC CIRCUIT FOR MEASURING TREAD DEPTH, AN ASSEMBLY AND A VEHICLE

(71) Applicant: Volvo Truck Corporation, Gothenburg (SE)

(72) Inventor: Joshua Shire, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/724,875

(22) Filed: Apr. 20, 2022

(65) Prior Publication Data

US 2022/0348042 A1    Nov. 3, 2022

(30) Foreign Application Priority Data

Apr. 27, 2021   (EP) .................................. 21170581

(51) Int. Cl.
*B60C 11/24*     (2006.01)
*G01B 7/26*     (2006.01)

(52) U.S. Cl.
CPC .............. *B60C 11/243* (2013.01); *G01B 7/26* (2013.01)

(58) Field of Classification Search
None
See application file for complete search history.

(56) References Cited

U.S. PATENT DOCUMENTS

| | | | |
|---|---|---|---|
| 6,991,013 B2 * | 1/2006 | Poulbot | H01Q 1/2241 156/123 |
| 7,103,460 B1 * | 9/2006 | Breed | G07C 5/008 706/15 |
| 9,831,922 B1 * | 11/2017 | Robinson | H04B 5/0043 |

(Continued)

FOREIGN PATENT DOCUMENTS

| | | |
|---|---|---|
| CN | 111497528 A | 8/2020 |
| DE | 19745734 A1 | 4/1999 |
| DE | 102018202604 A1 | 8/2019 |

OTHER PUBLICATIONS

Lin Yixiong; Variable-capacity tire thickness sensor; CN111497528A; Idesyn Semiconductor Corp; CPC B60C11/243 (CN); Published Aug. 7, 2020 (Year: 2020).*

(Continued)

*Primary Examiner* — Nasima Monsur
(74) *Attorney, Agent, or Firm* — Withrow & Terranova, PLLC

(57) ABSTRACT

A tire comprising an electronic circuit for measuring tread depth of a tread of the tire, wherein a groove is associated with the tread, the electronic circuit comprising a first conductive portion embedded in the tire and comprising a first conductive wire portion which extends in the tread and terminates open at an outer peripheral portion of the tread, a second conductive portion embedded in the tire and comprising a second conductive wire portion which extends in the tire and terminates open at an outer peripheral portion of the groove, and an electronic connection portion, wherein (Continued)

the first and second conductive portions are electrically connected via the electronic connection portion and extend from the electronic connection portion to the outer peripheral portions of the tread and groove, respectively.

20 Claims, 2 Drawing Sheets

(56) References Cited

U.S. PATENT DOCUMENTS

| | | | |
|---|---|---|---|
| 2005/0242935 A1* | 11/2005 | Kafrawy | B60C 11/243 |
| | | | 702/34 |
| 2012/0011926 A1* | 1/2012 | Bigot | B60C 11/243 |
| | | | 73/146 |
| 2017/0097223 A1 | 4/2017 | Darrer | |
| 2018/0264895 A1 | 9/2018 | Lettow et al. | |
| 2019/0184763 A1 | 6/2019 | Pulford et al. | |
| 2020/0070589 A1* | 3/2020 | Kuerzl | B60C 11/246 |

OTHER PUBLICATIONS

Extended European Search Report for European Patent Application No. 21170581.9, mailed Sep. 17, 2021, 9 pages.

* cited by examiner

TIRE COMPRISING AN ELECTRONIC CIRCUIT FOR MEASURING TREAD DEPTH, AN ASSEMBLY AND A VEHICLE

RELATED APPLICATIONS

The present application claims priority to European Patent Application No. 21170581.9, filed on Apr. 27, 2021, and entitled "TIRE COMPRISING AN ELECTRONIC CIRCUIT FOR MEASURING TREAD DEPTH, AN ASSEMBLY AND A VEHICLE," which is incorporated herein by reference in its entirety.

FIELD OF THE DISCLOSURE

The invention relates to a tire comprising an electronic circuit for measuring tread depth. The invention also relates to an assembly and to a vehicle.

The invention can be applied in heavy-duty vehicles, such as trucks, buses and construction equipment. Although the invention will be described with respect to heavy-duty vehicle, the invention is not restricted to this particular vehicle, but may also be used in other vehicles such as passenger cars and motorcycles.

BACKGROUND

A vehicle tire, typically a rubber tire, generally comprises a tread. The tread is the part of the tire that makes contact with a road during use, and the tread is associated with at least one groove, typically several grooves on the tire.

The tread depth may be measured manually by a user by e.g. a ruler. It may also be measured by use of a handheld physical gauge, some type of laser technology or by visible spectrum scanning technology. It is also known to use floor mounted tread depth measurement systems.

Furthermore, it is also known to provide measurement devices which are embedded in the tire and arranged to measure tread depth. For example, US2018/0264895 A1 discloses a diagnostics system which comprises an embedded measurement device in the tire for measuring tread depth.

Tire tread depth is important to monitor since a too small tread depth may significantly reduce the tire's performance. For example, a braking distance for braking a vehicle to standstill may increase significantly if the tire is worn down too much. Also, the risk of aquaplaning increases significantly if the tire tread depth is too small.

However, even though there exist technology for automatically measure tread depth, there is still a strive to develop further improved tire tread depth technology.

SUMMARY

An object of the invention is to provide an improved tire comprising an electronic circuit for measuring tread depth. A further object of the invention is to provide an improved assembly comprising a tire for measuring tread depth. A yet further object of the invention is to provide an improved vehicle.

According to a first aspect of the invention, the object is achieved by a tire.

Thus, a tire comprising an electronic circuit for measuring tread depth of a tread of the tire is provided, wherein a groove is associated with the tread. The electronic circuit comprises:

- a first conductive portion embedded in the tire and comprising a first conductive wire portion which extends in the tread and terminates open at an outer peripheral portion of the tread,
- a second conductive portion embedded in the tire and comprising a second conductive wire portion which extends in the tire and terminates open at an outer peripheral portion of the groove,
- an electronic connection portion, wherein the first and second conductive portions are electrically connected via the electronic connection portion and extend from the electronic connection portion to the outer peripheral portions of the tread and groove, respectively,
- wherein the first conductive portion has a first electrical length, as measured from the electronic connection portion to the outer peripheral portion of the tread, and wherein the second conductive portion has a second electrical length, as measured from the electronic connection portion to the outer peripheral portion of the groove,
- wherein the first electrical length and the second electrical length only differ by a difference in height between the outer peripheral portion of the tread and the outer peripheral portion of the groove.

By the provision of a tire as disclosed herein, a facilitated tread depth measurement is achieved. In particular, the present invention is based on an insight to use two connected conductive portions which have electrical lengths which are equal, except for a difference in height between the tread and the associated groove. Thereby, a waveform signal may be provided from the electronic connection portion and to each one of the first and second conductive portions, whereby the signals provided to each conductive portion can be used for determining the tread depth.

An "electrical length", also known as phase length, of a conductive portion is a term which is well-known for the skilled person and may be defined as the length of an electrical conductor in terms of the phase shift introduced by transmission over that conductor at a specific frequency.

The tread depth may for example be measured by identifying a difference in time when waveform signals reflected at the outer peripheral portions in each one of the first and second conductive portions are received by a receiving device.

The present invention is also based on a realization that each one of the first and second conductive wire portions may be worn down during use of the tire, thereby reflecting a change in tread depth during use.

Accordingly, by providing an electronic circuit as disclosed herein for measuring tread depth, an efficient measurement can be achieved in a cost-effective manner.

Optionally, the electronic circuit may further comprise a signal obtaining portion for obtaining a waveform signal, wherein the signal obtaining portion is electrically connected to the electronic connection portion such that an obtained waveform signal is transmitted to each one of the first and second conductive portions. Thereby, a waveform signal can be efficiently obtained and provided to each one of the first and second conductive portions, whereby the waveform signal can be reflected at each outer peripheral portion of the groove and tread, respectively, i.e. at the positions where the first and second wire portions terminate open.

Optionally, the first conductive portion may comprise a first transmitting portion for transmitting a reflected waveform signal which has been reflected in the first conductive wire portion at the outer peripheral portion of the tread. Still optionally, the first conductive portion may comprise a first directional coupler device, wherein the first conductive portion is coupled to the electronic connection portion via an input port of the first directional coupler device, the first transmitting portion is coupled to an isolated port of the first directional coupler device and the first conductive wire portion is coupled to an output port of the first directional coupler device. Such a coupler device has been found advantageous to use for distributing the obtained signal and for transmitting the reflected signal in an efficient and simple manner.

Optionally, the second conductive portion may comprise a second transmitting portion for transmitting a reflected waveform signal which has been reflected in the second conductive wire portion at the outer peripheral portion of the groove. Still optionally, the second conductive portion may comprise a second directional coupler device, wherein the second conductive portion is coupled to the electronic connection portion via an input port of the second directional coupler device, the second transmitting portion is coupled to an isolated port of the second directional coupler device and the second conductive wire portion is coupled to an output port of the second directional coupler device. As mentioned for the first directional coupler device, such a coupler device has been found advantageous to use for distributing the obtained signal and for transmitting the reflected signal in an efficient and simple manner.

Optionally, at least one of the signal obtaining portion, the first transmitting portion and the second transmitting portion may comprise an antenna. Thereby, waveform signals may be easily obtained in the tire and transmitted out from the respective transmitting portions. This implies a reduced need of additional wires, conductive portions etc. in the tire.

Optionally, at least two of the signal obtaining portion, the first transmitting portion and the second transmitting portion may comprise a respective antenna, wherein the respective antennas are configured such that they have different polarization. Thereby, it will be easier to differentiate between the different transmitted signals and also the obtained signal. This implies a more efficient tread depth measurement, mitigating the risk of measurement errors. Polarization of waveform signals is well-known by the skilled person and may be defined as a property of transverse waves that specifies the geometrical orientation of the oscillations.

Optionally, at least one of the respective antennas with different polarization may be a linearly polarized antenna, such as a vertically polarized antenna or a horizontally polarized antenna. Still optionally, one of the respective antennas with different polarization may be a circularly polarized antenna.

Optionally, the electronic circuit may be a passive circuit. By passive is herein meant that the electronic circuit is not connected to and powered by a power means, such as connected to and powered by a battery embedded in the tire and/or powered via a wired connection. Thereby, the electronic circuit can be made smaller and more cost-effective, since it does not have any battery embedded in the tire and/or any wired connection for powering the electronic circuit. As such, possible failures, such as power failures, will be mitigated.

Alternatively, the electronic circuit may be an active circuit. By active is consequently herein meant that the electronic circuit is connected to and powered by a power means, such as connected to and powered by a battery embedded in the tire and/or powered via a wired connection.

According to a second aspect of the invention, the object is achieved by an assembly.

Thus, an assembly for measuring tread depth of a tread of a tire is provided. The assembly comprises the tire according to any one of the embodiments of the first aspect of the invention and a receiving device which is configured to receive waveform signals which have been reflected in each one of the first and second conductive wire portions at the outer peripheral portions of the tread and groove, respectively.

Advantages and effects of the second aspect are largely analogous to the advantages and effects of the first aspect of the invention. It shall also be noted that any one of the embodiments of the second aspect of the invention is combinable with any one of the embodiments of the first aspect of the invention, and vice versa.

The receiving device may be part of the tire, e.g. embedded in the tire, and/or it may be provided outside of the tire, such as in a wheel rim or in any other part of a vehicle which the tire is mounted on.

Preferably, the assembly is configured to measure the tread depth by comparing the received waveform signals. Optionally, comparing the received waveform signals comprises determining a physical difference in height between the tread and the groove using phase shift and/or time domain reflectometry. For example, phase shift may be identified by use of a vector network analyzer, and time domain reflectometry may be performed by a time-domain reflectometer. The waveform signals may be multiplexed either spatially, using polarization or some other method, thereby e.g. enabling signals from the first and second transmitting portions to be differentiated, and/or preventing that signals are received by the transmitting portions.

According to a third aspect of the invention, the object is achieved by a vehicle.

Thus, a vehicle is provided which comprises the tire according to any one of the embodiments of the first aspect of the invention and/or the assembly according to any one of the embodiments of the second aspect of the invention.

Advantages and effects of the third aspect are largely analogous to the advantages and effects of the first and second aspects of the invention. It shall also be noted that any one of the embodiments of the third aspect of the invention is combinable with any one of the embodiments of the first and second aspects of the invention, and vice versa.

The vehicle may be any one of a truck, a bus, a construction equipment vehicle, and any other vehicle comprising a tire with a tread and at least one associated groove.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
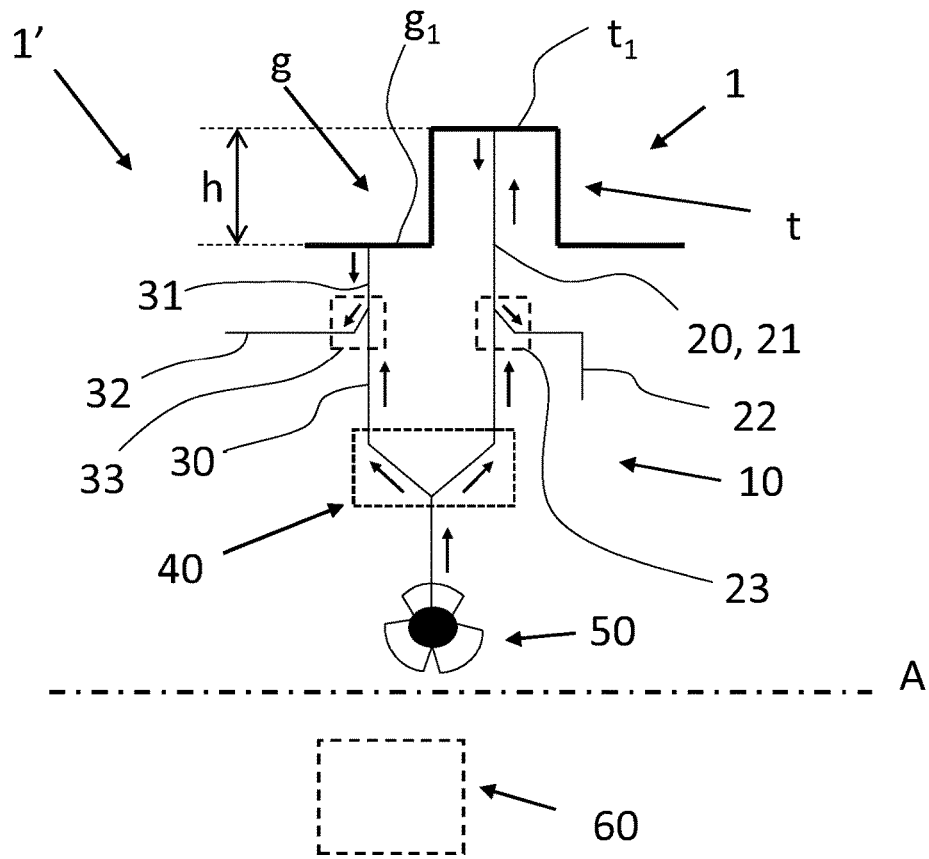
FIG. 1 is a schematic sectional view of a tire according to an embodiment of the present invention.

FIG. 1 depicts a tire 1 according to an example embodiment of the first aspect of the invention and also an assembly 1' according to an example embodiment of the second aspect of the invention. The schematic view of the tire 1 is a sectional view of a plane which is defined by a rotational axis A of the tire 1.

The tire 1 comprises an electronic circuit 10 for measuring tread depth h of a tread t of the tire 1, wherein a groove g is associated with the tread t. In this example, the groove g is provided adjacent to the tread t. The electronic circuit 10 comprises:

a first conductive portion 20 embedded in the tire 1 and comprising a first conductive wire portion 21 which extends in the tread t and terminates open at an outer peripheral portion $t_1$ of the tread t. The first conductive wire portion 21 is configured such that it will wear down with the tread t as the treads t wears down during use of the tire 1. For example, the first conductive wire portion 21 should have a diameter which is small enough so that it will wear down with the tread t during use of the tire 1. The first conductive wire portion 21 may for example have a diameter of about 1 millimetre or less.

The electronic circuit 10 further comprises:

a second conductive portion 30 embedded in the tire and comprising a second conductive wire portion 31 which extends in the tire and terminates open at an outer peripheral portion $g_1$ of the groove g, an electronic connection portion 40, wherein the first and second conductive portions 0, 30 are electrically connected via the electronic connection portion 40 and extend from the electronic connection portion 40 to the outer peripheral portions $t_1$, $g_1$ of the tread and groove t, g, respectively. The electronic connection portion 40 may for example be a radio frequency filtering power divider.

Furthermore, the first conductive portion 20 has a first electrical length, as measured from the electronic connection portion 40 to the outer peripheral portion $t_1$ of the tread t, and the second conductive portion 30 has a second electrical length, as measured from the electronic connection portion 40 to the outer peripheral portion g1 of the groove g. The first electrical length and the second electrical length only differ by a difference in height h between the outer peripheral portion $t_1$ of the tread t and the outer peripheral portion $g_1$ of the groove g. Thereby, the difference in height h between the tread t and the groove g can be determined by comparing waveform signals which have been reflected at the respective outer peripheral portions $t_1$, $g_1$ of the tread t and the groove g, respectively.

As shown in FIG. 1, the electronic circuit 10 may further comprise a signal obtaining portion 50 for obtaining a waveform signal, wherein the signal obtaining portion 50 is electrically connected to the electronic connection portion 40 such that an obtained waveform signal is transmitted to each one of the first and second conductive portions 20, 30.

Further in this embodiment, the first conductive portion 20 comprises a first transmitting portion 22 for transmitting a reflected waveform signal which has been reflected in the first conductive wire portion 21 at the outer peripheral portion of the tread $t_1$. As shown, the first conductive portion 20 may also comprise a first directional coupler device 23, which is shown in further detail in FIG. 2b. The first conductive portion 20 is coupled to the electronic connection portion 40 via an input port 231 of the first directional coupler device 23, the first transmitting portion 22 is coupled to an isolated port 232 of the first directional coupler device 23 and the first conductive wire portion 21 is coupled to an output port 233 of the first directional coupler device 23.

As further shown in FIG. 1, the second conductive portion 30 may comprise a second transmitting portion 32 for transmitting a reflected waveform signal which has been reflected in the second conductive wire portion 31 at the outer peripheral portion of the groove $g_1$.

Figures 2A, 2B:
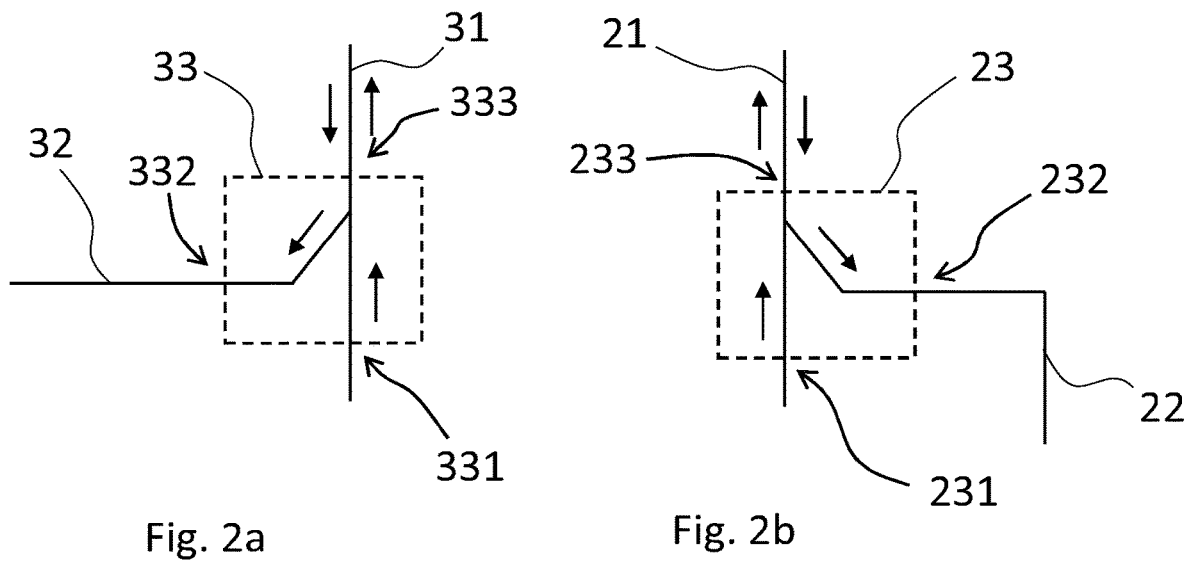
FIGS. 2*a-b* are schematic views of directional couplers of an electronic circuit according to an embodiment of the present invention.

Similar to the above, and detailed in FIG. 2a, the second conductive portion 30 comprises a second directional coupler device 33, wherein the second conductive portion 30 is coupled to the electronic connection portion 40 via an input port 331 of the second directional coupler device 33, the second transmitting portion 32 is coupled to an isolated port 332 of the second directional coupler device 33 and the second conductive wire portion 31 is coupled to an output port 333 of the second directional coupler device 33.

In each one of FIG. 1 and FIGS. 2a-2b, arrows are shown which represent the waveform signal and its direction in the different conductive portions.

In the shown embodiment, each one of the signal obtaining portion 50, the first transmitting portion 22 and the second transmitting portion 32 comprises an antenna 50, 22, 32. It shall however be noted that it is not a requisite to have three antennas as in the shown embodiment, also other configurations are possible. For example, instead of antennas, wired connections for obtaining and transmitting waveform signals are feasible.

As such, the signal obtaining portion 50, the first transmitting portion 22 and the second transmitting portion 32 comprises a respective antenna, and the respective antennas are configured such that they have different polarization. Thereby it will be easier to differentiate between the different waveform signals which are obtained and transmitted to/from the electronic circuit 10. In the shown embodiment, the first transmitting portion 22 comprises a vertically polarized antenna, the second transmitting portion 32 comprises a horizontally polarized antenna and the signal obtaining portion 50 comprises a circularly polarized antenna.

The electronic circuit 10 as shown is a passive circuit. However, it may also be an active circuit comprising e.g. a battery for powering the electronic circuit. An active electronic circuit may for example comprise a signal generation device for generating a waveform signal which is obtained by a signal obtaining device of the electronic circuit.

FIG. 1 further depicts an assembly 1' for measuring tread depth h of a tread t of a tire 1 according to the second aspect of the invention. The assembly 1' comprises the tire 1 and a receiving device 60, indicated by a box with dashed lines, which is configured to receive waveform signals which have been reflected in each one of the first and second conductive wire portions 21, 31 at the outer peripheral portions $t_1$, $g_1$ of the tread and groove t, g, respectively. Accordingly, the receiving device 60 is configured to receive waveform signals from the antennas of the first and second transmitting portions 22 and 32. According to an example embodiment, the receiving device 60 may be in the form of an electronic control unit which comprises means for receiving the wireless waveform signals from the antennas. Additionally, the receiving device 60 may also be configured to transmit a wireless waveform signal to the signal obtaining portion 50, and/or it may be connected to the signal obtaining portion via a wired connection (not shown). The wired connection may be configured to transmit a waveform signal. Further, the wired connection may also be configured to power the electronic circuit 10, thereby resulting in an active circuit.

Figure 3:
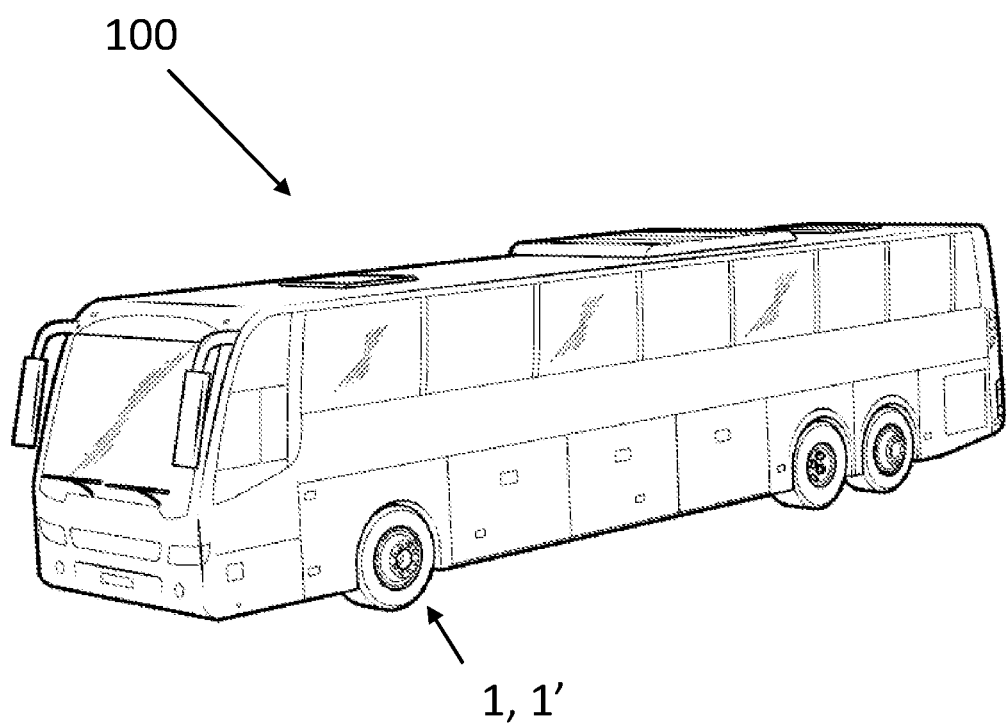
FIG. 3 is a perspective view of a vehicle in the form of a bus according to an embodiment of the present invention.

The receiving device 60 may be integrated in the tire 1, in a wheel on which the tire 1 is mounted or in a vehicle, such as the vehicle 100 shown in FIG. 3. For example, the receiving device 60 may be provided in a wheel rim (not shown). Thereby, the waveform signals may not need to travel a too long distance between the receiving device 60 and the electronic circuit 10, implying increased reliability.

The assembly 1' is configured to measure the tread depth h by comparing the received waveform signals. For example, comparing the received waveform signals comprises determining a physical difference in height h between the tread t and the groove g using phase shift and/or time domain reflectometry.

For example, the tread depth h may be determined by using phase shift distance measurement for determining physical distance, and to compare a difference in physical distance between the tread t and the groove g. For example, a distance between a source of a waveform signal and a reflection point, i.e. in this case the open ends of the wires portions 21, 31, can be calculated by:

$$L = \frac{\Delta \Phi}{180°} \times \lambda$$

where L is the physical length, $\lambda$ is the wavelength, $\Delta\Phi$ is the difference in phase between the transmitted and the reflected waveform signal and can be found by:

$$\Delta \Phi = \frac{\Delta t}{T} \times 180°$$

where T is the period of the waveform signal and $\Delta t = t_{peakB} - t_{peakA}$, where $t_{peakA}$ is the peak of the transmitted wave and $t_{peakB}$ is the peak of the received wave.

Each wire portion 21, 31 should be configured such that it is able to reflect back a significant portion of the energy of the transmitted waveform signal where it terminates open at the respective outer peripheral portions. This is possible as long as the length of each conductive portion 20, 30 is not a harmonic of the source waveform signal. In such a case the waveform signal would instead radiate as an antenna where the wire portion 21, 31 terminates open.

With respect to FIG. 3, an embodiment of a vehicle 100 according to the third aspect of the invention is shown. The vehicle 100 is here a bus with a tire 1 and an assembly 1' according to the invention. Alternatively, the vehicle may be a truck or construction equipment, such as a wheel loader. Still further, the vehicle may be a passenger car, a motorcycle, or any other vehicle using a tire with a tread and groove.

It is to be understood that the present invention is not limited to the embodiments described above and illustrated in the drawings; rather, the skilled person will recognize that many changes and modifications may be made within the scope of the appended claims.

The invention claimed is:

1. A tire comprising an electronic circuit for measuring tread depth of a tread of the tire, wherein a groove is associated with the tread, the electronic circuit comprising:
a first conductive wire embedded inside the tire which extends in the tread and terminates open at an outer peripheral portion of the tread,
a second conductive wire embedded inside the tire which extends in the tire and terminates open at a bottom surface of the groove, wherein the bottom surface of the groove comprises a surface closer to a center of the tire than the outer peripheral portion of the tread, and
an electronic connection inside the tire, wherein the first and second conductive wires are electrically connected via the electronic connection and extend from the electronic connection to the outer peripheral portions of the tread and groove, respectively,
wherein the first conductive wire has a first electrical length, as measured from the electronic connection to the outer peripheral portion of the tread, and wherein the second conductive wire has a second electrical length, as measured from the electronic connection to the bottom surface of the groove, and
wherein the first electrical length and the second electrical length only differ by a difference in height between the outer peripheral portion of the tread and the bottom surface of the groove.

2. The tire of claim 1, wherein the electronic circuit further comprises a signal obtaining portion for obtaining a waveform signal, wherein the signal obtaining portion is electrically connected to the electronic connection such that an obtained waveform signal is transmitted to each one of the first and the second conductive wires.

3. The tire of claim 2, wherein the first conductive wire comprises a transmitting antenna for transmitting a reflected waveform signal which has been reflected in the first conductive wire at the outer peripheral portion of the tread.

4. The tire of claim 3, further comprising a first directional coupler device, wherein:
the first conductive wire is coupled to the electronic connection via an input port of the first directional coupler device,
the transmitting antenna is coupled to an isolated port of the first directional coupler device, and
the first conductive wire is coupled to an output port of the first directional coupler device.

5. The tire of claim 2, further comprising a transmitting antenna for transmitting a reflected waveform signal which has been reflected in the second conductive wire at the bottom surface of the groove.

6. The tire of claim 5, further comprising:
a second directional coupler device, wherein:
the second conductive wire is coupled to the electronic connection via an input port of the second directional coupler device,
the transmitting antenna is coupled to an isolated port of the second directional coupler device, and
the second conductive wire is coupled to an output port of the second directional coupler device.

7. The tire of claim 2, wherein the signal obtaining portion comprises an antenna.

8. The tire of claim 7, wherein the antenna and a second antenna are configured such that they have different polarization.

9. The tire of claim 8, wherein at least one of the antenna and the second antenna with different polarization is a linearly polarized antenna, such as a vertically polarized antenna or a horizontally polarized antenna.

10. The tire of claim 8, wherein one of the antenna and the second antenna with different polarization is a circularly polarized antenna.

11. The tire of claim 1, wherein the electronic circuit is a passive circuit.

12. An assembly for measuring tread depth of a tread of a tire, the assembly comprising the tire of claim 1 and a receiving device which is configured to receive waveform signals which have been reflected in each one of the first and the second conductive wires at the outer peripheral portion of the tread and the bottom surface of the groove, respectively.

13. The assembly of claim 12, wherein the assembly is configured to measure the tread depth by comparing the received waveform signals.

14. The assembly of claim 13, wherein comparing the received waveform signals comprises determining a physical difference in height between the tread and the groove using phase shift and/or time domain reflectometry.

15. A vehicle comprising the tire of claim 1.

16. A vehicle comprising the assembly of claim 12.

17. The vehicle of claim 16, wherein the electronic circuit further comprises a signal obtaining portion for obtaining a waveform signal, wherein the signal obtaining portion is electrically connected to the electronic connection such that an obtained waveform signal is transmitted to each one of the first and the second conductive wires.

18. The vehicle of claim 17, further comprising a transmitting antenna for transmitting a reflected waveform signal which has been reflected in the second conductive wire at the bottom surface of the groove.

19. The vehicle of claim 17, wherein the signal obtaining portion comprises an antenna.

20. The vehicle of claim 19, wherein the antenna and a second antenna are configured such that they have different polarization.

* * * * *